United States Patent [19]

Yokoe et al.

[11] 4,309,809
[45] Jan. 12, 1982

[54] MACHINE TOOL WITH AN AUTOMATIC TOOL CHANGING DEVICE

[75] Inventors: Masaaki Yokoe; Mituo Kobayashi, both of Nagoya, Japan

[73] Assignee: Brother Kogyo Kabushiki Kaisha, Aichi, Japan

[21] Appl. No.: 128,899

[22] Filed: Mar. 10, 1980

[30] Foreign Application Priority Data

Mar. 9, 1979 [JP] Japan .................................. 54-27940

[51] Int. Cl.³ .............................................. B23Q 3/157
[52] U.S. Cl. ....................................... 29/568; 29/26 A
[58] Field of Search ................................ 29/568, 26 A

[56] References Cited

U.S. PATENT DOCUMENTS

| | | | |
|---|---|---|---|
| 3,281,935 | 11/1966 | Zankl et al. | 29/568 |
| 3,451,125 | 6/1969 | Lehmkuhl | 29/568 |
| 3,520,050 | 7/1970 | Trebble | 29/568 |
| 3,590,470 | 7/1971 | Brainard | 29/568 |
| 3,760,490 | 9/1973 | Burg | 29/568 |
| 4,164,290 | 8/1979 | Zankl | 29/568 X |

Primary Examiner—Z. R. Bilinsky
Attorney, Agent, or Firm—Browdy and Neimark

[57] ABSTRACT

A machine tool having an automatic tool changing device wherein a tool magazine storing many tools is rotatably carried by, and movable with, a spindle head, and a desired tool among them can be automatically selected for being set in a spindle. Each tool is respectively held in a proper tool carrying arm swingably supported by the rotary disc which is indexed by an indexing device to be rotated to bring the selected tool to a corresponding position to the spindle. The selected tool is directly set in the spindle, while being held in the tool carrying arm, in accordance with a swing movement of the tool carrying arm from a first position to a second position. The tool carrying arm, which keeps holding the tool in such a manner as to be rotatable with the spindle while machining, can be restored to the first position by a return swing back to the magazine together with the operation finished tool.

10 Claims, 7 Drawing Figures

MACHINE TOOL WITH AN AUTOMATIC TOOL CHANGING DEVICE

FIELD OF THE INVENTION

This invention relates to a machine tool provided with an automatic tool changing device, in which one out of a plurality of tools stored in a tool magazine is selected in a desired order for being attached to and detached from a spindle for the tool changing, and more particularly to a machine tool wherein a tool magazine is disposed on a spindle head which rotatably supports the spindle.

BACKGROUND OF THE INVENTION

As one of the automatic tool changing devices U.S. Pat. No. 3,218,706 can be at first exemplarily indicated, wherein a proposition is made to dispose a tool changing arm between the tool magazine mounted on the frame and the spindle. The tool changing arm in this example pulls out a tool which has been used in the immediately previous operation from the spindle to return the same into the tool magazine before selecting another tool suitable for the next operation from the tool magazine to fix the same to the spindle.

In this kind of tool changing devices the tool changing arm is obliged to follow several complicated steps for one round of tool changing, normally requiring a fairly long time.

Another example of a tool changing device can be seen in U.S. Pat. No. 3,600,777 wherein a plurality of tools are attached, equally spaced from each other, to the tool magazine rotatably supported on the spindle head, and the tool magazine is situated such that one of the plurality of tools comes on the axial line of the spindle to be selected for attachment to the spindle by means of an axial movement of the spindle.

Since in this device many tools are closely arranged side by side, one operation with the selected tool is liable to invite a damage of a tool by a collision or touching of the work (to be machined) with any one of the other tools not selected.

As a practicable way of avoiding this kind of trouble, enlarging of the spacing between the neighboring tools can be taken with a sacrifice of reducing the number of tools arranged in the tool magazine. A device for enabling the spindle to move in the axial direction for connecting the spindle with the selected tool is apt to become complex in its interior structure.

SUMMARY OF THE INVENTION

It is a primary object of this invention, in the light of the above-mentioned background of this field, to provide a machine tool with an automatic tool changing device wherein a selected tool can be directly set in the spindle by means of an indexing motion of the tool magazine and a swing motion of a tool carrying arm pivoted on the tool magazine.

A preferred embodiment in accordance with this invention includes a tool magazine rotatably supported on a spindle head, a plurality of tool carrying arms swingably arranged around the tool magazine at spaced intervals, indexing means for indexing the tool magazine for the purpose of moving a tool carrying arm to a position corresponding to the spindle, moving means operatively engaged with the selected tool carrying arm for moving the same between a first position in which the tool is withdrawn from the spindle and a second position in which the tool is set in the spindle, and means for transmitting the rotating motion of the spindle to the selected tool.

The tool changing operation is carried out by moving a tool carrying arm holding a tool which is presently set in the spindle, from the second position to the first position before an indexing of the tool magazine for moving another tool carrying arm holding a newly selected tool from the first position to the second position is performed. So the tool changing can be performed characteristically in a short period of time as well as in an accurate manner.

It is another object of this invention to provide a machine tool with an automatic tool changing device constructed such that not-selected tools are held in the first position so as not to disturb the operation of the selected tool and consequently enabling many tools to be closely arranged in the tool magazine.

BRIEF DESCRIPTION OF THE DRAWINGS

The appended drawings are all for illustrating a preferred embodiment of the present invention, in which.

DETAILED DESCRIPTION OF THE PREFERRED EMBODIMENT

A preferred embodiment of this invention will be described in detail with reference to the appended drawings.

Figure 1:
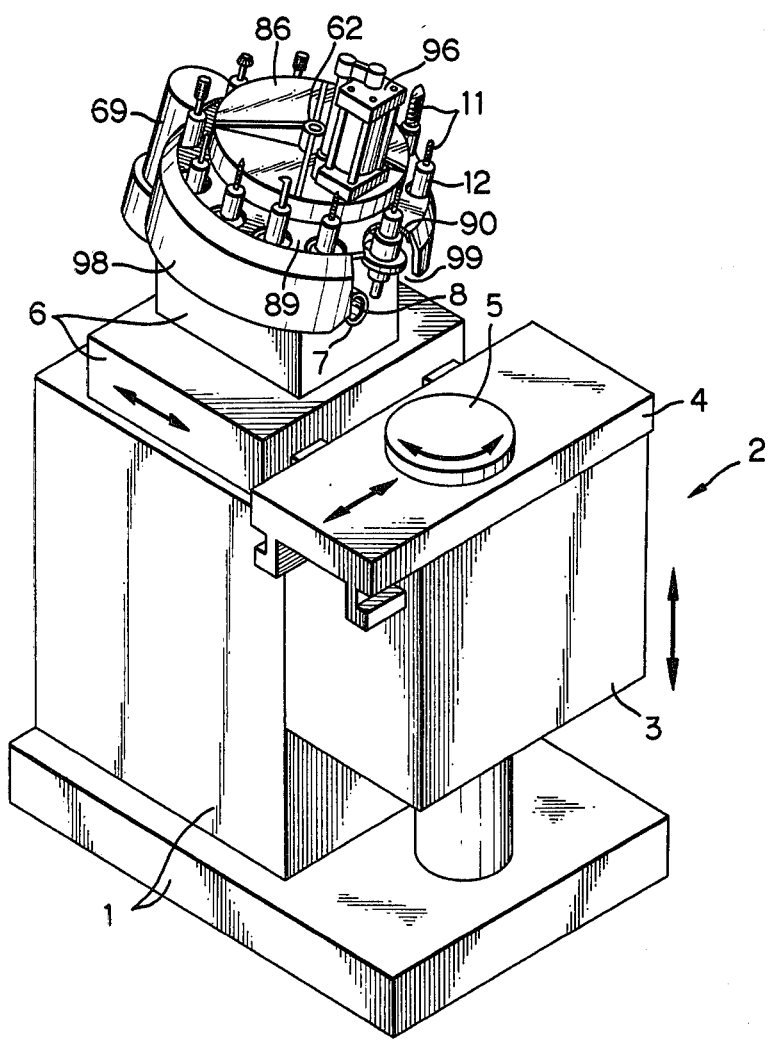
FIG. 1 is a schematical perspective view of a machine tool with a tool changing device of this invention.

FIG. 1 shows a machine tool with a tool changing device of this invention. On a main frame 1 a work supporting section 2 is disposed, which is provided with a vertically movable knee 3 and a slide 4 laterally movable, on which a rotary table 5 for fixedly supporting a work is mounted. The main frame 1 is also provided with a spindle head 6 horizontally movable in approaching to and departing from the work supporting section 2. In the spindle head 6 a spindle 7 having an axis parallel to the moving direction of the spindle head 6 is carried rotatably. On the tip of the spindle 7 a tool receiving hole 8 is formed facing the work supporting section 2. On the spindle head 6 a tool magazine 81 is disposed, a magazine shaft 62 being slant with the upper end thereof inclined toward the work supporting section 2, and an rotary disc 84 rotatably supported by the magazine shaft 62 constitutes a principal part of the tool magazine 81. The knee 3 and the slide 4 of the work supporting section 2 and the spindle head 6 are mutually related with a well-known feeding means so as to be relatively movable in a three dimensional direction, and the feeding means is driven by a plurality of driving means such as a pulse motor (not shown) which are sequentially operated by a series of commands from a numerical control system according to an operational program. Around the rotary disc 84 is disposed a cover 98 with a cutaway portion 99 only at a position facing the work supporting section 2.

Figure 3:
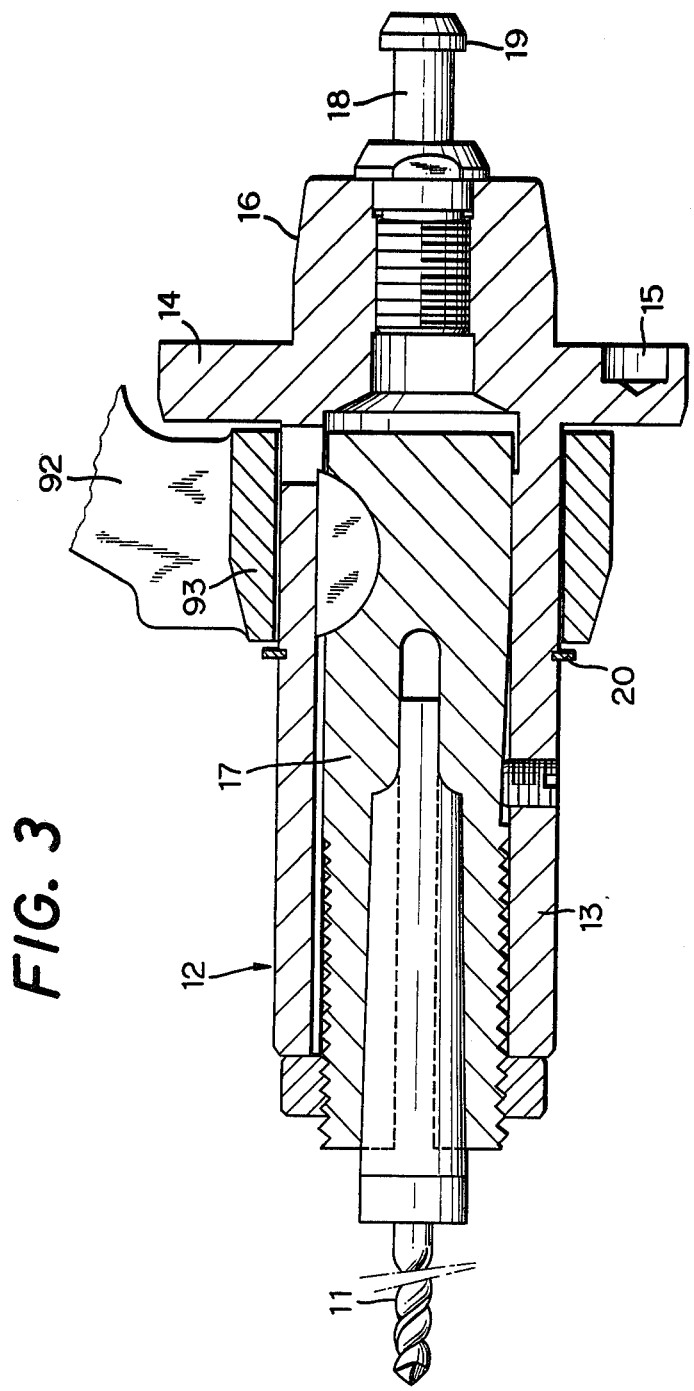
FIG. 3 is an enlarged axial section of a tool holder (12)

In this embodiment a tool holder 12 holding a given tool 11 inserted into the central hole from the front end thereof is exemplified. The tool holder 12 is composed of, as shown in FIG. 3, an outer socket 13 and an inner socket 17 which is rotation-restrictedly and axially adjustably inserted from the front end of the outer socket 13. Near the rear end of the outer socket 13 a friction flange 14 is outwardly formed, which is provided with a small engaging recess 15 at a place on the rear side thereof. The rear end portion of the outer socket 13 is provided with a fitting taper portion 16 by progressively reducing the external diameter. A drawn rod portion 18 screwed into the rear end portion of the outer socket 13 is protruded rearwards therefrom, on the tip thereof an engaging flange 19 being formed. The manner of attaching the tool 11 to the inner socket 17 does not need special explanation. On the periphery of the tool holder 12 is rotatably fitted a later described hollow cylinder portion 93 formed on the forward end of a tool carrying arm 92.

Figure 2:
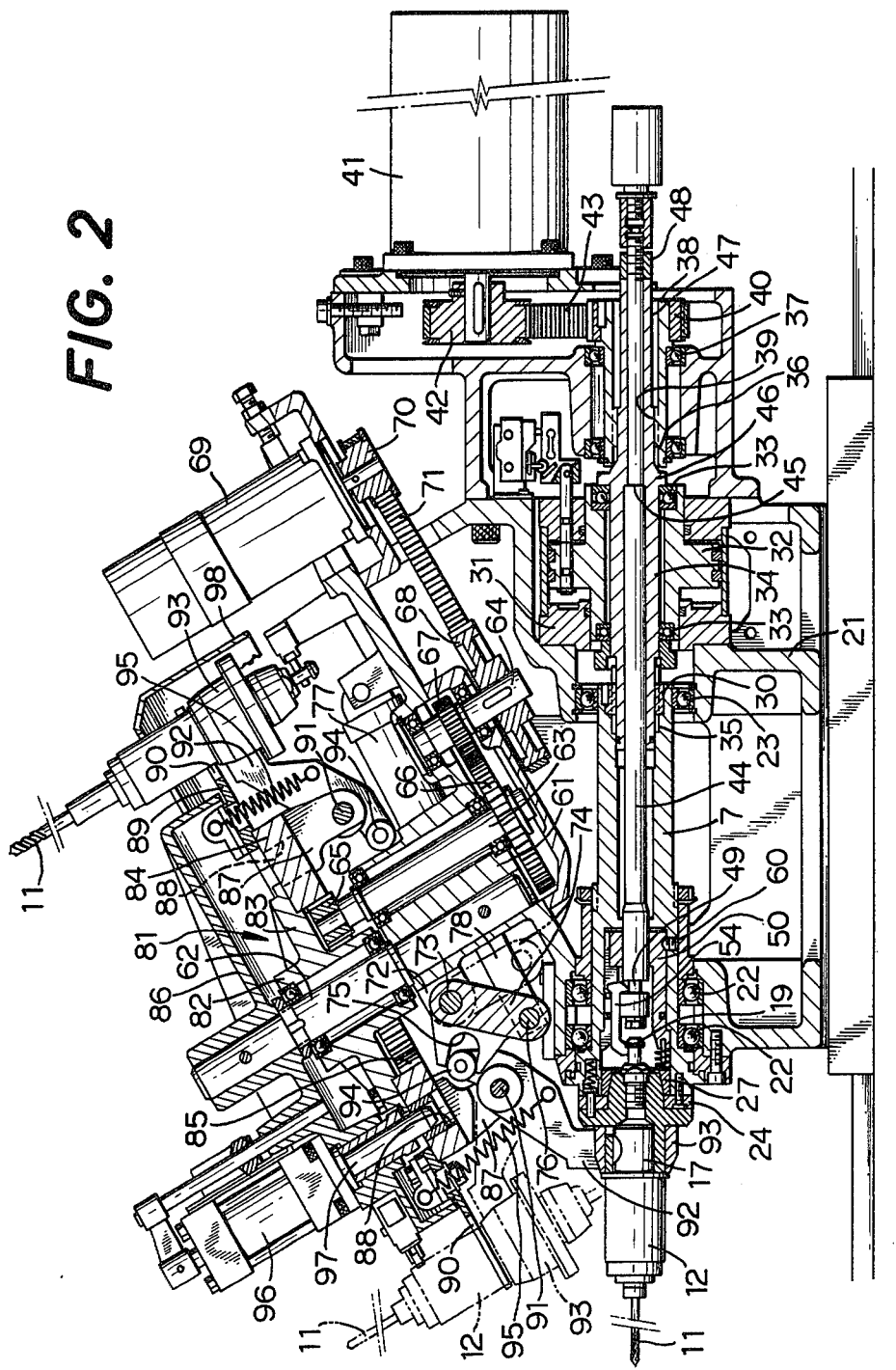
FIG. 2 is an axial section of an essential part of the device.

The spindle 7, on the front end of which a tool receiving hole 8 is formed in the center thereof, is of pipe form and horizontally carried as shown in FIG. 2, by bearings 22, 23 attached to a frame 21 of the spindle head 6. At the front end of the spindle 7 a friction ring 24 is attached in confrontation to the earlier stated friction flange 14. From one place of this ring an engaging pin 25 is protruded, by the resilient force of a spring 26, so as to be fitted into the engaging recess 15 for engagement. Inside the tool receiving hole 8, just inside of the friction ring 24, a taper ring 27 just fittable on the fitting taper portion 16 of the tool holder 12 is axially slidably disposed. The taper ring 27 is urged toward the fitting taper portion 16 by the resilient force of a coil spring 29 wound about a guide pin 28 which is protruded from the front end of a pawl holder 50 disposed in the tool receiving hole 8 (see FIG. 4).

On the rear side of the spindle 7 an air cylinder 31, being concentric with the spindle 7, is fixed to the frame 21 as an actuating means. Through the central part of a piston 32 of the air cylinder 31 an intermediate hollow shaft 34, which is free only in rotation by means of a thrust bearing 33, is pierced. A front end spline 35 on the external surface of the front end of the intermediate hollow shaft 34 is fitted into a spline hole 30 formed in the rear portion of the spindle 7, and a rear end spline 36 formed on the external surface of the rear end of the intermediate hollow shaft 34 is fitted into a spline hole 39 formed in the front portion of a driving hollow shaft 38, which is carried by the frame 21 via a bearing 37. On the driving hollow shaft 38 a pulley 40 is secured. The pulley 40 and another pulley 42 which is secured to the output shaft of an electric motor 41 for rotating the spindle 7 are connected by a timing belt 43.

Figure 4:
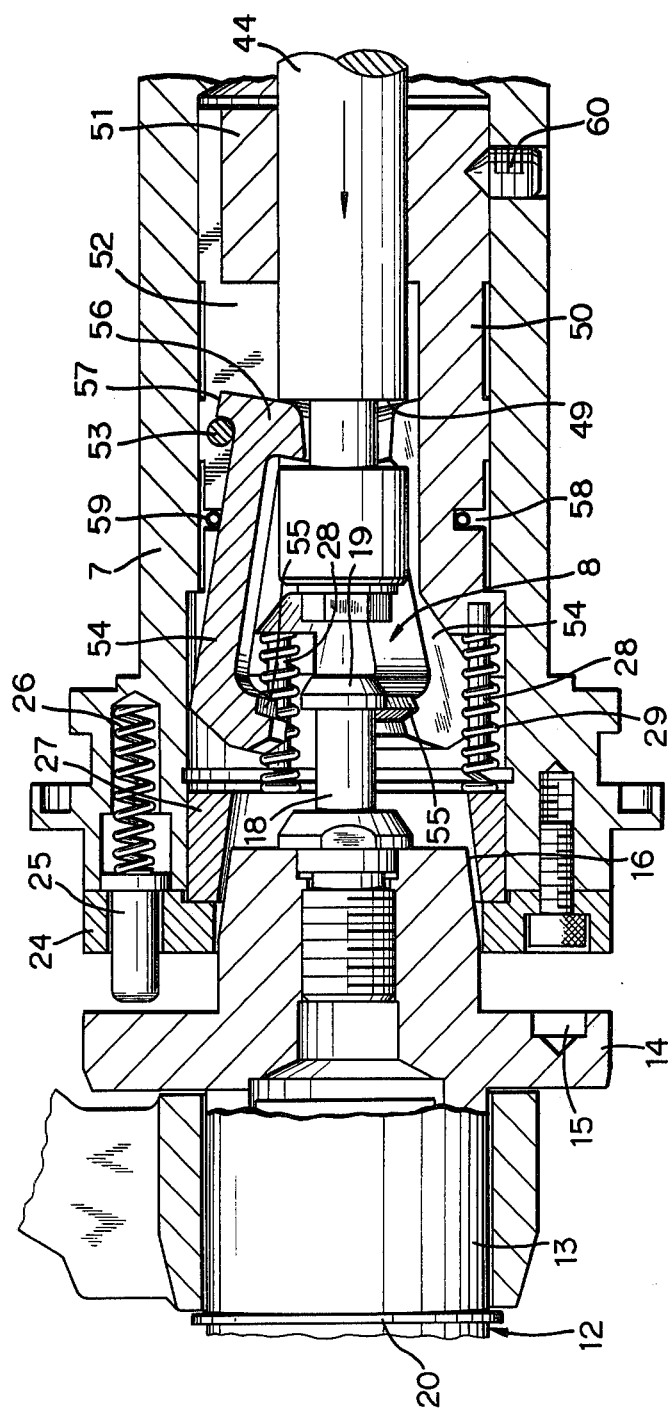
FIG. 4 is an enlarged axial section of the front end portion of the spindle (7)
Figure 5:
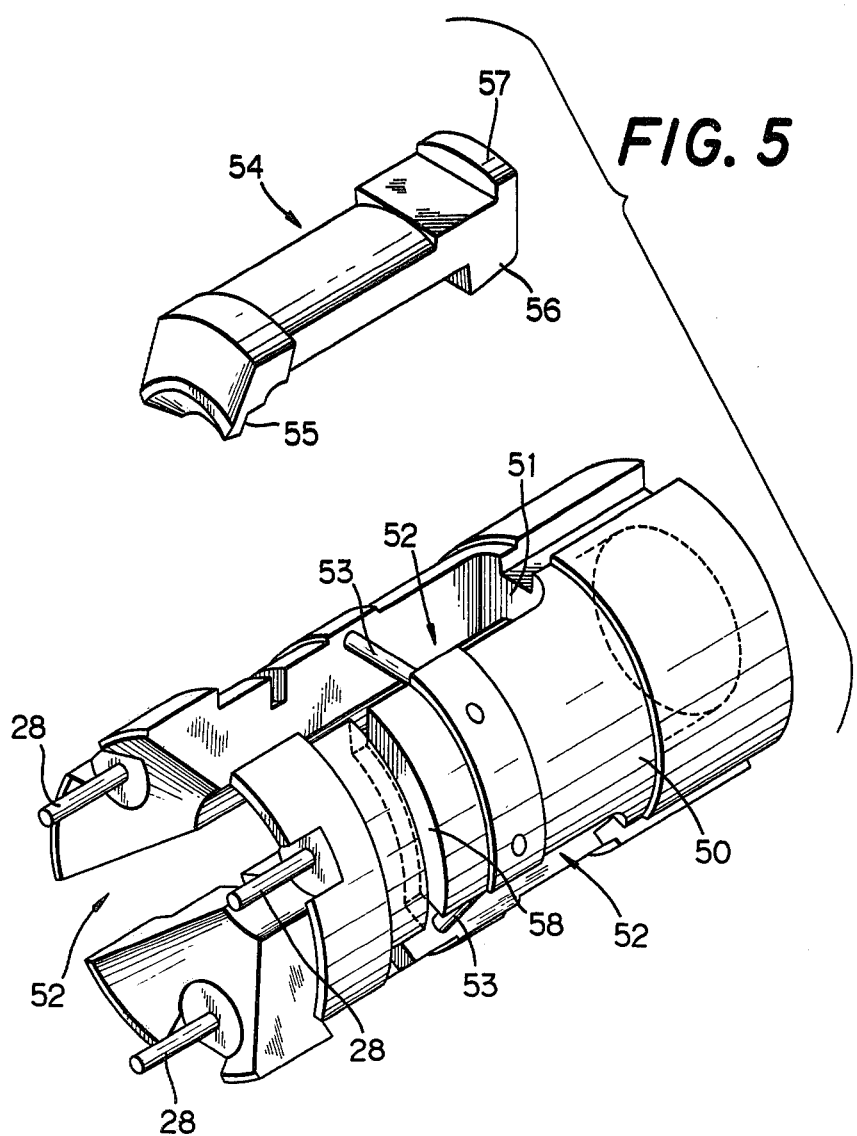
FIG. 5 is a perspective view of a pawl (54) and a pawl holder (50)

Through the central part of the spindle 7, the intermediate hollow shaft 34, and the driving hollow shaft 38 a pull bar 44 is pierced. A shoulder portion 45 of the pull bar 44 is engaged with another shoulder portion 46 of the central bore of the intermediate hollow shaft 34 from the forward direction. On a sleeve 47 which is fitted on the pull bar 44, inside the driving hollow shaft 38, for being abutted on the rear end of the intermediate hollow shaft 34, a nut 48 threaded on the rear end of the pull bar 44 is urged for enabling the pull bar 44 to move reciprocally with the piston 32 and the intermediate hollow shaft 34. The front end of the pull bar 44 is, as shown in FIG. 4 in enlargement, protruded loosely piercing through a boss 51 on the already stated pawl holder 50 into the tool receiving hole 8 of the spindle 7, and an engaging annular groove 49 is formed there on the front end. The pawl holder 50 is fixed in the tool receiving hole 8 with a set screw 60 or the like, and a few axial slots 52 are formed, as clearly shown in a perspective view of FIG. 5, from the front end of the pawl holder 50 to the front face of the boss 51. In traverse of the groove 52 a pin 53 is disposed, and a few pawls 54 are disposed respectively such that an engaging portion 55 on the front end thereof is for engaging in the radial direction with the engaging flange 19 formed on the drawn rod portion 18 of the tool holder 12, an inner protrusion 56 formed on the rear end is for constantly idly engaging with the engaging annular groove 49 of the pull bar 44, an outer protrusion 57 formed on the rear end is for being engaged with the pin 53 in the slot 52 from inside in order to open outwardly the front end of the pawl 54 when the pull bar 44 is pushed forward by checking the advance of the pawl 54. Numeral 59 designates a binding spring (ring shaped coil spring) fitted in a spring fitting annular groove 58 formed on the periphery of the pawl holder 50 for binding the pawls 54 at a position forward of the pin 53.

A magazine supporter 61 for rotatably and position indexably supporting the tool magazine 81 is attached to the frame 21 at a forwardly inclined attaching surface formed on the top of the frame 21 to become a part of it. On this magazine supporter 61 a magazine shaft 62, a magazine drive shaft 63, a counter shaft 64, etc., are disposed slantingly toward the work supporting section 2. The magazine shaft 62 is disposed such that the axis thereof intersects the axis of the spindle 7 at a fixed angle. On the magazine shaft 62 a boss member 82 with a flange 83 is rotatably fitted, and on the lower side of the flange 83 a doughnut shaped rotary disc 84 having an internal gear teeth 85 on the inner surface thereof, is attached. Above the boss member 82 a cover 86 is secured to the magazine shaft 62. On the upper end of the magazine drive shaft 63 a pinion 65 engageable with the internal gear teeth 85 is secured, and on the lower end thereof a spur gear 66 engageable with a pinion 67 on the counter shaft 64 is secured. A pulley 68 fixed to the counter shaft 64 and another pulley 70 secured to the output shaft of a reversively rotatable stepping motor 69 which is secured to the frame 21 with a parallel axis with the magazine shaft 62 and others are connected by a timing belt 71. On the front side of the magazine shaft 62 a pin 73 piercing a pair of support arms 72 pivots a swing arm 74, which fits the fitting taper portion 16 of the tool holder 12 and the drawn rod portion 18, into the tool receiving hole 8 of the spindle 7 by means of controlling the swing of the tool carrying arm 92. The swing arm 74 is provided with a fork portion 75, being inverted L-shape, on the front end to be engaged with a roller 94 pivoted on the rear end of the tool carrying arm 92. On either end of a pin 76 getting through the lower end of the swing arm 74 a pair of piston rods 78 of a pair of air cylinders 77 are connected, which air cylinders are disposed on either side of the magazine shaft 62, being pivoted at the rear end thereof on the magazine supporter 61.

Figure 6:
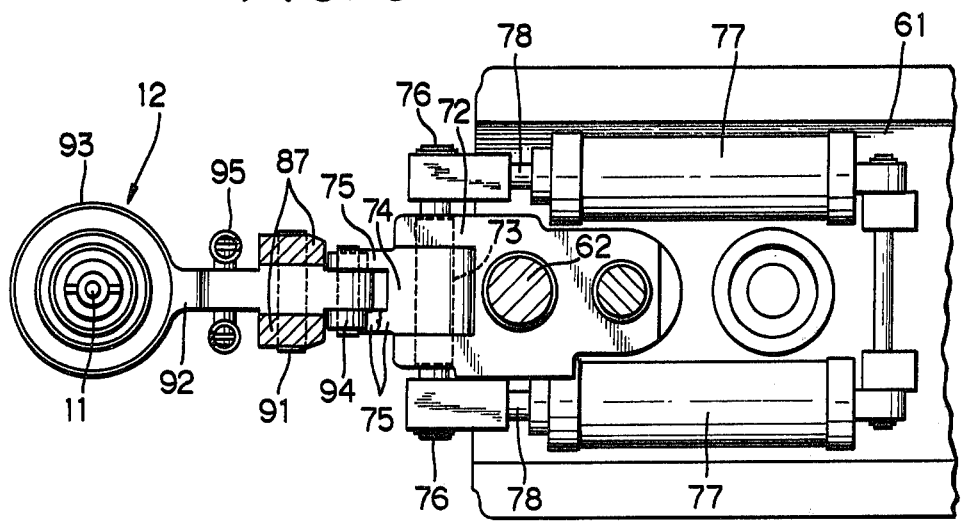
FIG. 6 is a plan view of a swing arm (74) and its environment.

On the lower surface of the rotary disc 84 of the tool magazine 81 a plurality pairs of support members 87 are secured with a predetermined angular distance, and corresponding to each of the support members 87 a precise index aperture 88 is formed on the rotary disc 84. On the periphery of the rotary disc 84 an annular plate 89 is attached in the radially extended direction from the former, and a plurality of cutaway portions 90 are formed in the radial direction in conformity with each support member 87. On a pin 91 laterally pierced through each support member 87, the tool carrying arm 92, having a hollow cylinder portion 93 with a tool holder 12 on the tip thereof, is pivoted (see FIG. 6). The tool carrying arms 92 are arranged with an equal angular inter-distance in a radial direction with its center at the rotational axis of the rotary disc 84, that is, the axis of the magazine shaft 62, and at the same time are swingably pivoted on the pin 91 within a plane including the radial line and the axis of the magazine shaft 62. On either end of a pin piercing through the rear end of the tool carrying arm 92 a roller 94 is attached. Between a pin 92a, fixed to a portion outside the pin 91 of the tool carrying arm 92, and the annular plate 89 a tension spring 95 is spanned to hold the tool holder 12 such that a part thereof above the hollow cylinder portion 93 protrudes upwards from the cutaway portion 90. The tool carrying arm 92 is kept at this state with the axis of the tool 11 being parallel with the axis of the magazine shaft 62.

As shown in FIG. 2, an air cylinder 96, having a piston to which a locating rod or member 97, which is fitted into the index aperture 88 halted right above the spindle 7 in a straight line movement is connected, is attached on the cover 86. The locating member 97 and the index aperture 88 constitute means for locking the tool magazine with the spindle head, via the cover 86.

The magazine drive shaft 63 rotates, by being driven by the stepping motor 69, via the counter shaft 64 and the rotary disc 84 through the pinion 65, and is an example of an indexing means which transfers one of the tool carrying arms 92 to a corresponding position to the tool receiving hole 8 i.e. a position in which the axis of a tool carried by a selected tool carrying arm out of the tool carrying arms is placed in a plane including the axis of the spindle and the tool magazine (position shown with chain dotted lines in FIG. 2). The stepping motor 69 is capable of moving accurately the desired tool carrying arm 92, which should be moved to the above-mentioned position, which is predetermined by rotating the same, either clockwise or counterclockwise, choosing the lesser rotational angle.

Operation of the above-mentioned embodiment will be described next. In a state wherein the tool 11 is set in the spindle 7, the piston 32 of the air cylinder 31 is drawn back accompanied by the similarly retracted pull bar 44, the drawn rod portion 18 of the tool holder 12 is accommodated into the tool receiving hole 8 by having been drawn back through engagement of the engaging flange 19 and the engaging portion 55 of the pawl 54, and the friction flange 14 is closely abutted on the front surface of the friction ring 24. The tool 11 is stably set in the spindle 7, through close fitting of the taper portion 16 in the taper ring 27, in a rightly aligned state with the axis of the spindle 7. The tool 11, correctly aligned with the spindle 7 in such manner is firmly accommodated in the tool receiving hole 8 as shown in FIG. 2, entirely eliminating undesired vibration or lateral oscillation.

Figure 7:
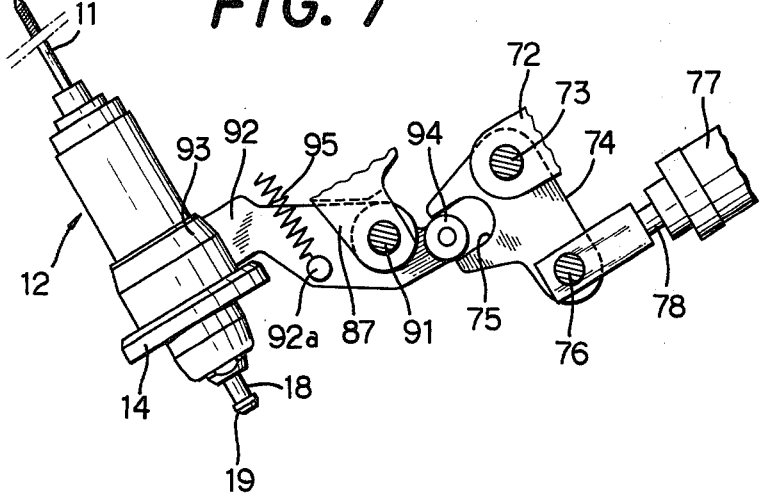
FIG. 7 is an elevational view of the swing arm (74) and its environment.

When the tool 11 is desired to be removed from the position shown in FIG. 2, leftward movement of the piston 32 with the stoppage of the electric motor 41, leftward movement of the engaging annular groove 49 of the pull bar 44, and releasing of the engaging flange 19 of the tool holder 12 from the grasping by the engaging portions 55 through opening of the pawls 54 take place in succession. Next steps to be followed are withdrawal of the piston rod 78 of the air cylinder 77 and swinging of the swing arm 74 for pushing downwards the rollers 94 by the fork portion 75 and swinging the tool carrying arm 92 with the aid of the tension spring 95. Then the tool carrying arm 92 is moved from the first position, where the tool 11 is set in the tool receiving hole 8 of the spindle, to the second position shown in FIG. 2 with chain dotted lines. Here the tool carrying arm 92 is held so that the tool holder 12 is parallel to the axis of the magazine shaft 62 and protruded upwards, at the front portion beyond the hollow cylinder portion 93, through the cutaway portion 90 of the annular plate 89. At this time the locating member 91 is lifted up from the index aperture 88. On the other hand the swing arm 74 is also moved for restoring the fork portion 75 to the status shown in FIG. 7 in order to allow the rotation of the boss member 82 of the tool magazine 81 and the annular plate 84. Immediately afterwards a certain number of pulse signals are given to the stepping motor 69 by the numerical control system, the magazine drive shaft 63 is caused to rotate, due to rotation of the counter shaft 64 actuated by the timing belt 71, and engagement takes place between the pinion 67 and the spur gear 66. The rotation movement of the magazine drive shaft 63 is transmitted, through meshing of the pinion 65 with the internal gear teeth 85, to the rotary disc 84 of the tool magazine 81, which enables automatic indexing for moving a designated tool carrying arm 92 to a corresponding position in the tool receiving hole 8 of the spindle 7. Having finished the position indexing, the air cylinder 96 is started to work again, causing the locating member 97 to descend for fitting into the index aperture 88 which belongs to the above mentioned tool carrying arm 92. A series of operations stated hereunder will follow thereafter: extending of the piston rod 78 of the air cylinder 77; swinging of the swing arm 74 for taking a posture as illustrated with solid lines in FIG. 2; engaging of the fork portion 75 with the rollers 94; swinging of the selected tool carrying arms 92, resisting the spring force of the tension spring 95, to the illustrated position with solid lines in FIG. 2; making the friction flange 14 of the tool holder 12 abut onto the front surface of the friction ring 24 of the spindle 7; and inserting the fitting taper portion 16, the drawn rod portion 18, the engaging flange 19, etc., into the tool receiving hole 8 of the spindle 7 as illustrated in FIG. 2. At this time the taper ring 27 moves by slightly compressing the coil spring 29, but it is restored to the original position, when the fitting taper portion 16 is justly settled in place, to make the tool 11 aligned with the axis of th spindle 7. At this stage the piston 32 is rightwardly shifted accompanied by the movement of the pull bar 44, and the drawn rod portion 18 of the tool holder 12 is similarly drawn rightwardly by the grasping of the engaging flange 19 with the engaging portions 55, which is caused by the inward swing of the pawls 54 with the aid of the engaging annular groove 49 and the pins 53. Then the friction flange 14 and the fitting taper portion 16 are respectively abutted on the friction ring 24 and the taper ring 27 under pressure in order to firmly connect the tool 11 to the spindle 7. Rotation of the electric motor 41 at this state will initiate the rotation of the spindle having the tool 11 on the tip thereof. The engaging pin 25 is not always fitted into the engaging recess 15, but it is fitted, only when the tool holder 12 is rotated relatively to the spindle 7 at a possible occurrence of extraordinary rotational resistance on the tool 11, upon coinciding of the engaging recess 15 with the engaging pin 25.

A series of sequence operations of the above-mentioned tool changing is controlled by a part of the working program, but a well-known feeding back system is employed to an individual operation wherein a recognition of the finish of a previous operation by the limit switch will allow the initiation of an operation to follow.

This embodiment has the above-mentioned structure as well as the operational features corresponding to the structure as follows, and enjoys many industrial merits as stated below.

FEATURES

Instead of attaching many tools on the rotary disc, which is rotatably mounted on the spindle head for being a principal part of the tool magazine, many tool carrying arms having a tool on one end thereof in a swingable manner are pivoted on the rotary disc; and Tool changing can be executed in only two movements of swinging back of a tool carrying arm presently set in the spindle. The swinging of another tool carrying arm which has been moved to a position where the arm is capable of being connected to the spindle, is effected by way of rotation of the rotary disc.

MERITS

Tool changing can be carried out most accurately;

Tool changing requires only a small space, because a simple reversible movement of fitting the rear end of the tool to, and detaching the same from, the spindle is possible, which allows the tool changing operation time to be minimized, greatly improving the operation efficiency of the machine tool;

Keeping of some distance between the rotary disc and the tool set in the spindle enables the rotary disc not to disturb the machining operation;

Tools not set in the spindle can not disturb the operation of the tool set in the spindle when the base portion of the tool set in the spindle approaches the work to be machined, because the tools not set in the spindle are held in a sheltered state by the tool carrying arms, preventing a collision or touching with a work to be machined; and Holding of the tool by the spindle results in a high degree of machining precision because the spindle of simple structure is securely carried by the spindle head rotating at a substantially constant rotational speed.

What is claimed is:

1. A machine tool provided with an automatic tool changing device comprising:
   (a) a frame,
   (b) a spindle head mounted on the frame adapted for rotatably carrying a spindle having a tool receiving hole,
   (c) a tool magazine mounted on the spindle head being adapted to be rotated about an axis intersecting the axis of the spindle at a fixed angle,
   (d) a plurality of tool carrying arms supported by the tool magazine in a circular array equally spaced from one another, each of the arms being adapted to be swingable in a plane which includes the axis of the tool magazine and extending in a radial direction from the axis, each of said arms rotatably carrying a tool about an axis positioned in said plane,
   (e) each of the tool carrying arms being provided with an annular bearing portion for carrying said tool rotatably about the axis thereof,
   (f) holding means for normally holding the tool carrying arms in a first position in which the tool is detached from the spindle,
   (g) indexing means operatively connected to the tool magazine for rotating and holding it in a first position in which the axis of a selected tool carried by a selected tool carrying arm lies in a plane including the axis of the spindle and the axis of the tool magazine,
   (h) moving means for moving the selected tool carrying arm from the first position to a second position in which the selected tool is directly set in the tool receiving hole of the spindle and alternately from the second position to the first position so as to detach the selected tool from the spindle, and
   (i) transmitting means for transmitting the rotating motion of the spindle to the selected tool set in the tool receiving hole of the spindle, said assembly permitting rotation of the selected tool set in the tool receiving hole while being non-detachedly carried by the selected tool carrying arm.

2. A machine tool with an automatic tool changing device according to claim 1 wherein:
   (a) each of the tool carrying arms is pivotably mounted at the middle portion thereof on the tool magazine, and rotatably carries a tool on one end thereof and has a projecting portion on the other end thereof,
   (b) the holding means included a spring means disposed between each of the tool carrying arms and the tool magazine for normally holding the tool carrying arm in the first position, and
   (c) the moving means includes
      I a swing arm pivotably mounted on the spindle head and having an operating portion engaged with the projecting portion of the selected tool carrying arm, and
      II actuating means for actuating the swing arm so as to move the selected tool carrying arm from the first position to the second position against the action of the spring means for setting the tool in the spindle and to move the selected tool carrying arm from the second position to the first position for detaching tool from the spindle.

3. A machine tool with an automatic tool changing device according to claim 2 wherein:
   (a) the projecting portion includes a roller rotatably mounted on the tool carrying arm, and
   (b) the operating portion of the swing arm is formed into a fork shape for engaging with the roller of the tool carrying arm.

4. A machine tool with an automatic tool changing device according to claim 2 wherein:
   the actuating means includes
      (a) an air cylinder pivotably mounted on the spindle head at one end thereof, and
      (b) a piston-rod of the air cylinder connected to the swing arm at the one end thereof.

5. A machine tool with an automatic tool changing device according to claim 1 wherein:
   the indexing means includes locking means for locking the tool magazine with the spindle head when the selected tool carrying arm is rotated to the position in which the axis of the tool carried by the selected tool carrying arm is placed in the plane including the axis of the spindle and the axis of the tool magazine.

6. A machine tool with an automatic tool changing device according to claim 5 wherein:
the locking means includes
(a) a plurality of apertures formed on the tool magazine correspondingly to the number of tool carrying arms, and
(b) a member mounted on the spindle head and adapted to be inserted into one of the apertures of the tool magazine.

7. A machine tool with an automatic tool changing device according to claim 1 wherein:
the transmitting means includes
(a) a pull bar slidably mounted in the spindle along the axis thereof,
(b) means for actuating the pull bar to move along the axis of the spindle,
(c) a plurality of pawls movably disposed in the spindle together with the pull bar and adapted to catch the tool set into the tool receiving hole due to the backward movement of the pull bar and to release the tool therefrom due to the forward movement of the pull bar, and
(d) a frictional engaging surface formed on the spindle for frictionally transmitting the rotating motion of the spindle to the tool set in the tool receiving hole,
thereby the rotating motion of the spindle is transmitted to the tool upon the frictional engagement between the tool and the frictional engaging surface when the tool is caught and pulled backwards by the pawls.

8. A machine tool with an automatic tool changing device according to claim 1 wherein:
the holding means includes a spring means disposed between each of the tool carrying arms and the tool magazine for normally holding each of the tool carrying arms in the first position in which the axis of the tool substantially is parallel to the axis of the tool magazine.

9. A machine tool with an automatic tool changing device according to claim 1, wherein the transmitting means comprises
(a) a pull bar slidably mounted in the spindle along the axis thereof and provided with an engaging annular groove on the external surface of a front end portion thereof,
(b) means for actuating the pull bar to move along the axis of the spindle,
(c) a cylindrical holder fixed in the spindle and having a plurality of circumferentially spaced slots parallelly extending with the axis of the holder,
(d) a pawl movably disposed in each of the slots and having a front engaging portion formed on a front end thereof for engaging with an engaging portion formed on a rear end of the tool set in the tool receiving hole, a rear inner protrusion formed on a rear end of the pawl and fitted into the engaging annular groove of the pull bar, and a rear outer protrusion outwardly protruding from the rear end of the pawl,
(e) a pin disposed in each of the slots to intersect the same, the pin being positioned to engage with an outer surface of the pawl to make the pawl swing inwardly for engagement of the engaging portions of the pawl and the tool when the pawl is backwardly pulled by the pull bar, and to engage with the rear outer protrusion of the pawl to make the pawl swing outwardly for disengagement of the engaging portions of the pawl and the tool when the pawl is forwardly pushed, and
(f) a frictional engaging surface which is formed on the spindle for frictionally engaging with the tool to transmit the rotation of the spindle when the tool is backwardly pulled by the pull bar via the pawl.

10. A machine tool comprising:
(a) a frame,
(b) a spindle head mounted on the frame adapted for rotatably carrying a spindle having a tool receiving hole,
(c) drive means for rotating the spindle,
(d) a pull bar slidably mounted in the spindle along the axis thereof and provided with an engaging annular groove on the external surface of a front end portion thereof,
(e) means for actuating the pull bar to move along the axis of the spindle,
(f) a cylindrical holder fixed in the spindle and having a plurality of circumferentially spaced slots parallelly extending with the axis of the holder,
(g) a pawl movably disposed in each of the slots and having a front engaging portion formed on a front end thereof for engaging with an engaging portion found on a rear end of the tool receiving hole, a rear inner protrusion formed on a rear end of the pawl and fitted into the engaging annular groove of the pull bar, and a rear outer protrusion outwardly protruding from the rear end of the pawl,
(h) a pin disposed in each of the slots to intersect the same, the pin being positioned to engage with an outer surface of the pawl to make the pawl swing inwardly for engagement of the engaging portions of the pawl and the tool when the pawl is backwardly pulled by the pull bar, and to engage with the rear outer protrusion of the pawl to make the pawl swing outwardly for disengagement of the engaging portions of the pawl and the tool when the pawl is forwardly pushed, and
(i) a frictional engaging surface which is formed on the spindle for frictionally engaging with the tool to transmit the rotation of the spindle when the tool is backwardly pulled by the pull bar via the pawl.

* * * * *